United States Patent [19]

Kamiyama et al.

[11] Patent Number: 5,474,823
[45] Date of Patent: Dec. 12, 1995

[54] PIPE LINER BAG, MANUFACTURING METHOD THEREFOR AND PIPE REPAIR METHOD

[75] Inventors: Takao Kamiyama, Hiratsuka; Yasuhiro Yokoshima, Ibaraki, both of Japan

[73] Assignees: Shonan Gosei-jushi Seisakusho K.K., Kanagawa; Yokoshima & Company, Ibaraki, both of Japan

[21] Appl. No.: 223,563

[22] Filed: Apr. 6, 1994

[30] Foreign Application Priority Data

Apr. 13, 1993 [JP] Japan .................. 5-086457

[51] Int. Cl.⁶ .................................. B29D 22/00
[52] U.S. Cl. .............. 428/36.91; 264/516; 264/564; 428/36.1; 428/36.3; 428/212; 428/213; 428/240
[58] Field of Search ................ 428/36.1, 36.3, 428/36.91, 212, 213, 240; 264/516, 564

[56] References Cited

U.S. PATENT DOCUMENTS 5,082,701  1/1992  Craven et al. ............... 428/240
5,143,374  9/1992  Shibasaki ................... 428/36.3
5,328,742  7/1994  Tukihara .................... 428/36.3
5,334,429  8/1994  Imoto et al. ................ 428/36.91

FOREIGN PATENT DOCUMENTS 60-242038  12/1985  Japan.

*Primary Examiner*—James J. Bell
*Attorney, Agent, or Firm*—Lowe, Price, LeBlanc & Becker

[57] ABSTRACT

A pipe liner bag is provided for reliably lining a pipe into which water may penetrate. The pipe liner bag has a double layer structure including an inner layer of a tubular nonwoven fabric made of fine yarn of three deniers or less and an outer layer of a tubular nonwoven fabric made of fat yarn of 3–15 deniers. The tubular nonwoven fabric constituting the inner layer is impregnated with highly viscous and thixotropic hardenable resin mixed with granule fillers of a small diameter, while the tubular nonwoven fabric constituting the outer layer is impregnated with hardenable resin mixed with granule filler of a large diameter. After the pipe liner bag is everted and inserted into a pipe to be repaired by fluid pressure, the hardenable resin impregnated in the pipe liner bag is cured while maintaining the internal pressure thereof constant. When this pipe liner bag is used to repair a pipe from which a branch pipe is branched off, it can be integrated with a branch pipe liner bag.

14 Claims, 3 Drawing Sheets

5,474,823

PIPE LINER BAG, MANUFACTURING METHOD THEREFOR AND PIPE REPAIR METHOD

BACKGROUND OF THE INVENTION

1. Field of the Invention

The present invention relates to pipe lining techniques, and more particularly to a pipe liner bag, a manufacturing method therefor, and a pipe repair method which is conducted by using the pipe liner bag.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to the method described in the above-mentioned publication, the pipe repair method comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe. (Hereinafter, this manner of procedure shall be called "everting".) When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

However, the above-mentioned method, if applied to an underground pipe into which ground water penetrates, gives rise to a problem that the thermosetting resin impregnated in the pipe liner bag get in touch with the ground water to cause the thermosetting resin to be incompletely cured.

To solve the above problem, a method of lining a pipe using a multi-layer pipe liner bag has been proposed. A multi-layer liner bag for this method is shown in FIG. 7. Each of layers of the liner bag is impregnated with a hardenable resin or a grout material such that a layer impregnated with the grout material is pressed against the inner wall of a pipe to be repaired when the pipe liner bag is everted and inserted into the pipe.

According to the above-mentioned method, the grout material impregnated in the outermost layer, which can get in touch with ground water, is cured if touching ground water or the like, the hardenable resin impregnated in inner layers is protected from incomplete curing possibly caused by ground water, thus enabling an underground pipe or the like, into which ground water penetrates, to be favorably lined with the hardenable resin.

However, since the grout material and hardenable resin are generally different in category, a flange portion 112a of a branch pipe liner bag 112 for lining a branch pipe 111 is not integrated with a pipe liner bag 101, as shown in FIG. 7. Further, if a barrier film or the like intervenes between the flange portion 112a of the branch pipe liner bag 112 and the pipe liner bag 101, the flange portion 112a and the pipe liner bag 101 is not integrated.

OBJECT AND SUMMARY OF THE INVENTION

The present invention has been made in view of the above-mentioned problem, and a first object thereof is to provide a pipe liner bag which is capable of reliably lining a pipe into which ground water may penetrate and also capable of integrating with a branch pipe liner bag.

A second object of the present invention is to provide a method of manufacturing the above-mentioned pipe liner bag.

A third object of the present invention is to provide a pipe repair method which is capable of reliably lining a pipe, into which ground water penetrates, by using the above-mentioned pipe liner bag as well as capable of integrating the pipe liner bag and a branch pipe liner bag.

To achieve the first object, the present invention provides a pipe liner bag formed of a double tube structure comprising: an inner layer made of a first tubular nonwoven fabric weaved with first yarn, the first tubular nonwoven fabric constituting the inner layer being impregnated with highly viscous and thixotropic first hardenable resin mixed with granule fillers of a first diameter; and an outer layer made of a second tubular nonwoven fabric weaved with second yarn fatter than the first yarn, the second tubular nonwoven fabric constituting the outer layer being impregnated with hardenable resin mixed with granule fillers of a second diameter which is larger than the first diameter.

To achieve the second object, the present invention provides a method of manufacturing a pipe liner bag having a double layer structure comprising the steps of: (a) preparing a first layer including a first tubular nonwoven fabric by impregnating the first tubular nonwoven with hardenable resin, the hardenable resin being mixed with granule fillers of a first diameter; (b) preparing a second layer including a second tubular nonwoven fabric by impregnating the second tubular nonwoven fabric with highly viscous and thixotropic hardenable resin, the hardenable resin being mixed with granule fillers of a second diameter, and coating the outer surface of the second tubular nonwoven fabric with a highly air-tight plastic tube, the plastic tube being removable from the second layer; (c) everting and inserting the second layer into the first layer by applying fluid pressure to the second layer; and (d) peeling the plastic tube from the second layer.

To achieve the third object, the present invention provides a method of repairing a pipe by using the pipe liner bag of the type mentioned above, wherein liquid may penetrate into the pipe, comprising the step of: (a) everting and inserting the pipe liner bag into the pipe by applying fluid pressure to the pipe liner bag; (b) applying pressure into the pipe liner bag to increase the internal pressure of the pipe liner bag to a constant value; and (c) curing hardenable resin impregnated in the pipe liner bag with the internal pressure of the pipe liner bag being held at the constant value.

When the pipe liner bag according to the present invention is everted and inserted into a pipe to be repaired by fluid pressure, the inner layer and the outer layer of the pipe liner bag 1 are reversed, whereby the tubular nonwoven fabric made of the second yarn (3–15 deniers) is the inner layer, while the tubular nonwoven fabric made of the first yarn (3 deniers or less) is the outer layer.

Since the tubular nonwoven fabric constituting the outer layer is impregnated with the highly viscous and thixotropic thermosetting resin with granule fillers of a relatively small diameter mixed therein, even if the tubular nonwoven fabric suffers from water penetrating into the pipe, the granule fillers of a relatively small diameter, which have entered among fine fibers of the nonwoven fabric, effectively prevent the thermosetting resin from flowing with the penetrating water. The viscosity and thixotropy of the thermosetting resin itself are so high that the thermosetting resin is reliably cured, exhibiting a high reaction, without being poured by water. On the other hand, the tubular nonwoven fabric serving as the inner layer is impregnated with thermosetting resin which is mixed with granule fillers of a relatively large diameter, so that applied internal pressure, if maintained in the pipe liner bag 1 during a repair operation, causes the granule fillers of a relatively large diameter to move through the tubular nonwoven fabric toward the outside and stay on a boundary between the inner layer and the outer layer. This prevents water from penetrating into the inner layer. For this reason, the thermosetting resin impregnated in the inner layer is reliably cured, so that even a pipe into which water may penetrate can be lined without failure.

Further, since the tubular nonwoven fabric of the outer layer can be impregnated with a type of thermosetting resin identical to that which is impregnated in a branch pipe liner bag adjacent thereto, the pipe liner bag of the invention and the branch pipe liner bag 12, after cured, are completely integrated with each other, and will not be separated.

The above and other objects, advantages and features of the invention will appear more fully hereinafter in the following description given in connection with the accompanying drawings and the novelty thereof pointed out in the appended claims.

DESCRIPTION OF THE PREFERRED EMBODIMENTS

The present invention will hereinafter be described in conjunction with the preferred embodiment thereof with reference to the accompanying drawings.

Figure 1:
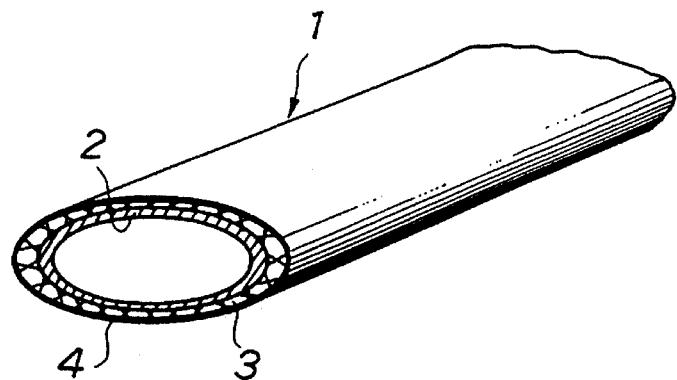
FIG. 1 shows a partial perspective view of a pipe liner bag according to the present invention.

FIG. 1 shows a partial perspective view of a pipe liner bag 1 according to the present invention, wherein the pipe liner bag 1 has a double structure comprising an inner layer of a tubular nonwoven fabric made of fine yarn having a diameter of three deniers or less, and an outer layer of a tubular nonwoven fabric made of fat yarn having a diameter ranging between 3 and 15 deniers. The tubular nonwoven fabric may be made of polyester, polypropylene, acrylic resin or the like.

The outer surface of the tubular nonwoven fabric 3 constituting the outer layer is coated with a highly air-tight plastic film 4 which may be made of polyurethane, polyethylene, or the like. The tubular nonwoven fabric 3 is impregnated with a thermosetting resin which is mixed with granule fillers having a relatively large diameter. The tubular nonwoven fabric 2 constituting the inner layer in turn is impregnated with a thermosetting resin having high thixotropy and viscosity which is mixed with granule fillers having a relatively small diameter.

As the thermosetting resin impregnated in the tubular nonwoven fabrics 2, 3, unsaturated polyester resin, epoxy resin, and vinyl ester resin may be employed by way of example. Also, the granule fillers mixed in the thermosetting resin may be made of calcium carbonate, aluminum hydroxide, magnesium oxide, alumina, whiskers titanate or the like, the mixed ratio of which is set to 1–50 percent.

Next, a method of manufacturing the pipe liner bag 1 constructed as described above will be explained with reference to FIGS. 2 and 3 which show the processes of the manufacturing method in order.

Figure 2:
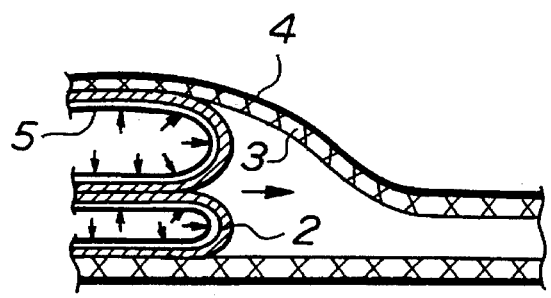
FIGS. 2 and 3 are cross-sectional views showing in order the processes of a method of manufacturing the pipe liner bag according to the present invention.

In manufacturing the pipe liner bag 1, the tubular nonwoven fabric 2 constituting the inner layer is everted and inserted into the tubular nonwoven fabric 3 constituting the outer layer by fluid pressure, as shown in FIG. 2. In this event, the outer surface of the tubular nonwoven fabric 2 before being everted is coated with a highly air-tight plastic tube 5 which can be readily peeled.

Figure 3:
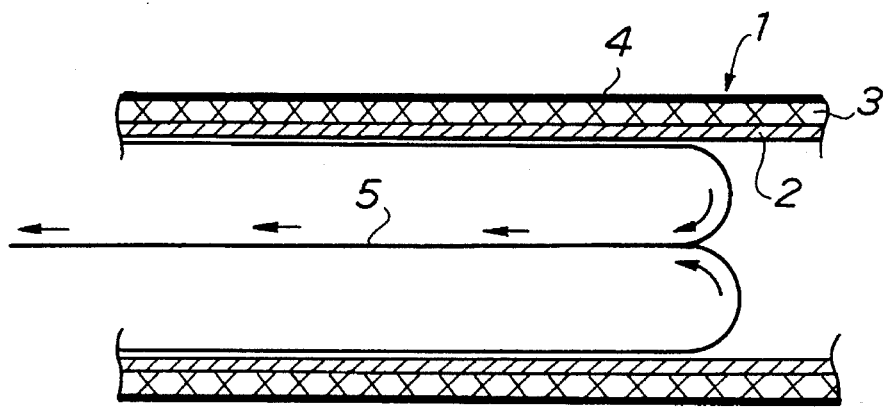

When the tubular nonwoven fabric 2 has been completely inserted into the tubular nonwoven fabric 3 over the whole length thereof, the plastic tube 5 is pulled in the direction indicated by the arrow in FIG. 3 to be peeled from the tubular nonwoven fabric 2. In this manner, the pipe liner bag 1 as shown in FIG. 1 is completed.

Figure 4:
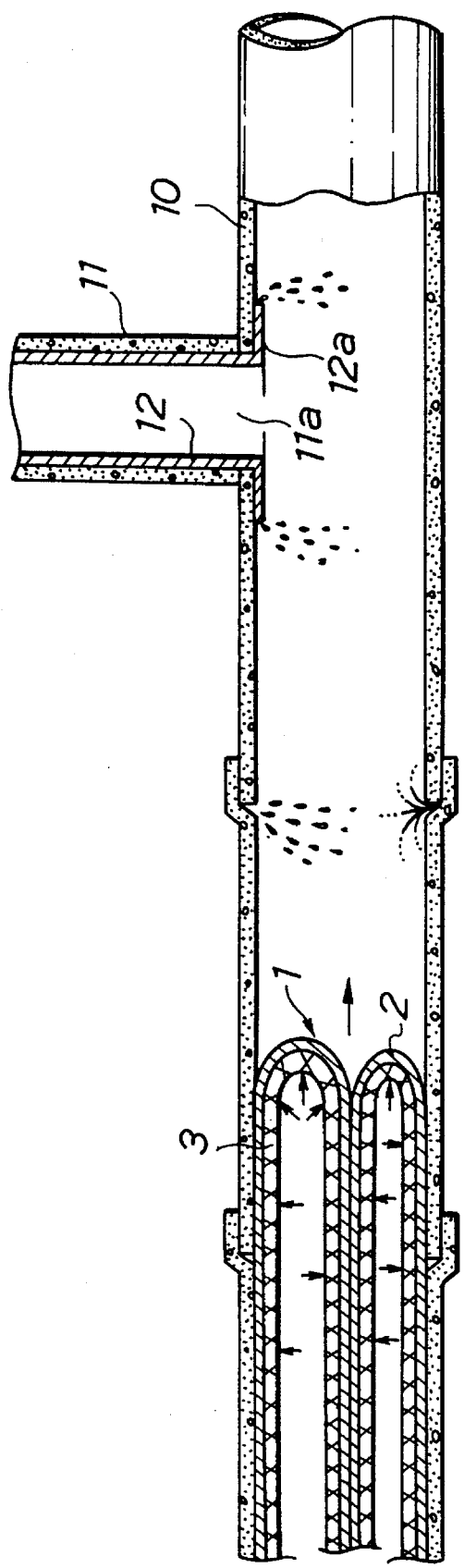
FIGS. 4–6 are cross-sectional views showing in order the processes of a method of repairing a pipe according to the present invention.

Next, a pipe repair method executed by use of the pipe liner bag 1 will be explained with reference to FIGS. 4–6 which show the processes of the repair method in order. In this embodiment, the pipe repair method is executed to line a pipe 10 into which water may penetrate through joints or the like as shown in FIG. 4. It is assumed that a branch pipe 11 branching off the pipe 10 has already been lined by a branch pipe liner bag 12.

Referring to FIG. 4 in more detail, when the pipe 10 is to be repaired, the pipe liner bag 1 is everted and inserted into the pipe 10 by fluid pressure. This causes the inner layer and the outer layer of the pipe liner bag 1 to be reversed, whereby the tubular nonwoven fabric 3 made of relatively fat yarn of 3–15 deniers is the inner layer, while the tubular nonwoven fabric 2 made of relatively fine yarn of three deniers or less is the outer layer.

When the pipe liner bag 1 has been everted and inserted into the pipe 10, the pressure inside the pipe liner bag 1 is increased and held at a constant large value to press the pipe liner bag 1 against the inner wall of the pipe 10. In this state, the pipe liner bag 1 is heated by an appropriate means to cure the thermosetting resin impregnated therein. An example of the appropriate means for heating the pipe liner bag 1 may be hot water which may be applied thereto through a hose from the outside.

In this event, since the tubular nonwoven fabric 2 or the outer layer is impregnated with the highly viscous and thixotropic thermosetting resin with granule fillers of a relatively small diameter mixed therein, even if the tubular nonwoven fabric 2 suffers from water possibly penetrating into the pipe 10, the granule fillers of a relatively small diameter, which have entered among fine fibers of the nonwoven fabric 2, effectively prevent the thermosetting resin from flowing with the penetrating water. The viscosity and thixotropy of the thermosetting resin itself are so high that the thermosetting resin is reliably cured, exhibiting a high reaction, without being poured by water. It should be noted that when polyester resin is employed as the thermosetting resin to be impregnated into the tubular nonwoven fabric with magnesium oxide being mixed therewith as granule fillers, a thickening action works on the thermosetting resin at temperatures from 40° C. to 80° C., which makes the thermosetting resin further resistant to water.

On the other hand, the tubular nonwoven fabric 3 serving as the inner layer is impregnated with thermosetting resin which is mixed with granule fillers of a relatively large diameter, so that internal pressure, applied to the pipe liner bag 1 during the repair operation, causes the granule fillers of a relatively large diameter to move through the tubular nonwoven fabric 3 toward the outside and stay on a boundary between the inner layer (tubular nonwoven fabric 3) and the outer layer (tubular nonwoven fabric 2), thus preventing water from penetrating into the tubular nonwoven fabric 3 or the inner layer. For this reason, the granule fillers of a relatively large diameter ensure that the thermosetting resin impregnated in the tubular nonwoven fabric 3 or the inner layer is cured completely.

Figure 5:
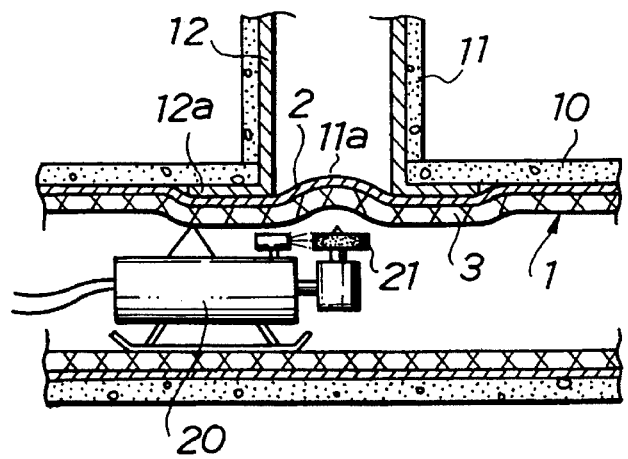
Figure 6:
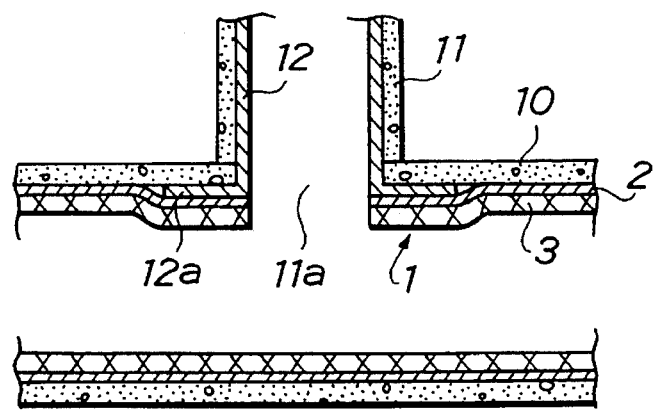
Figure 7:
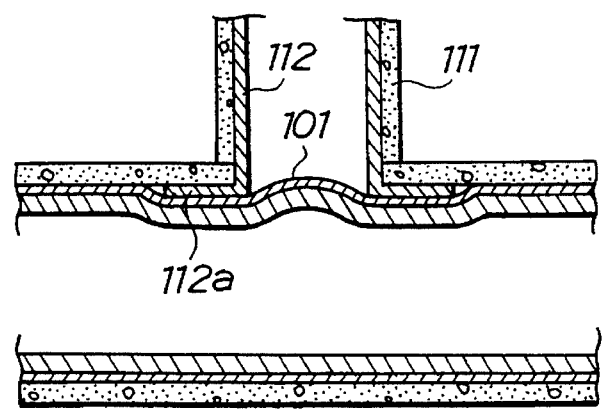
FIG. 7 is a cross-sectional view for explaining a conventional pipe repair method.

As described above, even if water may penetrate into the pipe 10, the thermosetting resin impregnated in the pipe liner bag 1 is ensured to be cured, the pipe 10 is lined by use of the cured pipe liner bag 1 and thus repaired as shown in FIG. 5. Further, in this case, the tubular nonwoven fabric 2 can be impregnated with a type of thermosetting resin identical to that which is impregnated in a branch pipe liner bag 12 adjacent to the tubular nonwoven fabric 2, so that the pipe liner bag 1 and a flange portion 12a of the branch pipe liner bag 12, after cured, are completely integrated with each other, and will not be separated.

Afterward, a work robot 20 is introduced into the pipe 10 to cut a portion of the pipe liner bag 1 covering a branch pipe opening 11a (where the branch pipe 11 is open to the pipe 10) with a cutter 21 mounted to the work robot 20, whereby the branch pipe 11 communicates with the pipe 10, completing a series of the lining operation for the pipe 10.

As is apparent from the foregoing description, the present invention enables a pipe into which water may penetrate to be reliably lined as well as the pipe liner bag and a branch liner bag to be integrated with each other.

While the invention has been described in its preferred embodiment, it is to be understood that modifications will occur to those skilled in the art without departing from the spirit of the invention. For instance, the thermosetting resin may be replaced by another hardenable resin such as thermosetting resin. The scope of the invention is therefore to be determined solely by the appended claims.

What is claimed is:

1. A pipe liner bag formed in a double tube structure comprising:

an inner layer made of a first tubular nonwoven fabric of a first yarn, said first tubular nonwoven fabric constituting the inner layer being impregnated with highly viscous and thixotropic first hardenable resin mixed with granule fillers of a first diameter; and an outer layer made of a second tubular nonwoven fabric of a second yarn having a higher denier than said first yarn, said second tubular nonwoven fabric constituting the outer layer being impregnated with hardenable resin mixed with granule fillers of a second diameter which is larger than said first diameter.

2. A pipe liner bag according to claim 1, wherein said first yarn has the diameter of three denier or less, and said second yarn has the diameter ranging from 3 to 15 deniers.

3. A pipe liner bag according to claim 1, wherein said first and second nonwoven fabrics are made of polyester, polypropylene or acrylic resin.

4. A pipe liner bag according to claim 1, wherein said second tubular nonwoven fabric constituting the outer layer is coated with a highly air-tight plastic film.

5. A pipe liner bag according to claim 4, wherein said highly air-tight plastic film comprises polyethylene or polyurethane.

6. A pipe liner bag according to claim 1, wherein:

said hardenable resin impregnated in said tubular nonwoven fabrics is selected from a group including unsaturated polyester resin, epoxy resin, and vinyl ester resin; and said granule fillers mixed in said thermosetting resin are made of calcium carbonate, aluminum hydroxide, magnesium oxide, alumina, or whiskers titanate, the mixed ratio of which is set at a value from one or more to 50 or less in percent.

7. A method of manufacturing a pipe liner bag having a double layer structure comprising the steps of:

(a) preparing a first layer including a first tubular nonwoven fabric by impregnating said first tubular nonwoven with hardenable resin, said hardenable resin being mixed with granule fillers of a first diameter;

(b) preparing a second layer including a second tubular nonwoven fabric by impregnating said second tubular nonwoven fabric with highly viscous and thixotropic hardenable resin, said hardenable resin being mixed with granule fillers of a second diameter, and coating the outer surface of said second tubular nonwoven fabric with a highly air-tight plastic tube, said plastic tube being removable from said second layer;

(c) everting and inserting said second layer into said first layer by applying fluid pressure to said second layer; and (d) peeling said plastic tube from said second layer.

8. A method according to claim 7, wherein said first and second nonwoven fabrics are made of polyester, polypropylene or acrylic resin.

9. A method according to claim 7, wherein said highly air-tight plastic film comprises polyethylene or polyurethane.

10. A method according to claim 7, wherein:

said hardenable resin impregnated in said tubular nonwoven fabrics is selected from a group including unsaturated polyester resin, epoxy resin, and vinyl ester resin; and said granule fillers mixed in said thermosetting resin are made of calcium carbonate, aluminum hydroxide, magnesium oxide, alumina, whiskers titanate or the like, the mixed ratio of which is set from one percent or more to 50 percent or less.

11. A method of repairing a pipe by using the pipe liner bag according to claim 1, wherein liquid may penetrate into said pipe, comprising the step of:
   (a) everting and inserting said pipe liner bag into the pipe by applying fluid pressure to said pipe liner bag;
   (b) applying pressure into said pipe liner bag to increase the internal pressure of said pipe liner bag to a constant value; and
   (c) curing hardenable resin impregnated in said pipe liner bag with the internal pressure of said pipe liner bag being held at said constant value.

12. A method according to claim 11, wherein said curing step comprises the step of applying heat to said pipe liner bag, said heat being conducted to said pipe liner bag from hot water being applied thereto.

13. A method of repairing a pipe, from which a branch pipe is branched off, by using the pipe liner bag according to claim 11, wherein liquid may penetrate into said pipe, comprising the steps of:
   (a) everting and inserting said pipe liner bag into the pipe by applying fluid pressure to said pipe liner bag;
   (b) applying pressure into said pipe liner bag to increase the internal pressure of said pipe liner bag to a constant value;
   (c) curing hardenable resin impregnated in said pipe liner bag with the internal pressure of said pipe liner bag being held at said constant value; and
   (d) cutting part of said pipe liner bag corresponding to a branch pipe opening at which said pipe and said branch pipe are connected.

14. A method according to claim 13, wherein said curing step comprises the step of applying heat to said pipe liner bag, said heat being conducted to said pipe liner bag from hot water being applied thereto.

* * * * *